March 26, 1963 D. J. GARDNER 3,082,744
SERVOMOTOR CONTROL VALVE
Filed Aug. 2, 1961
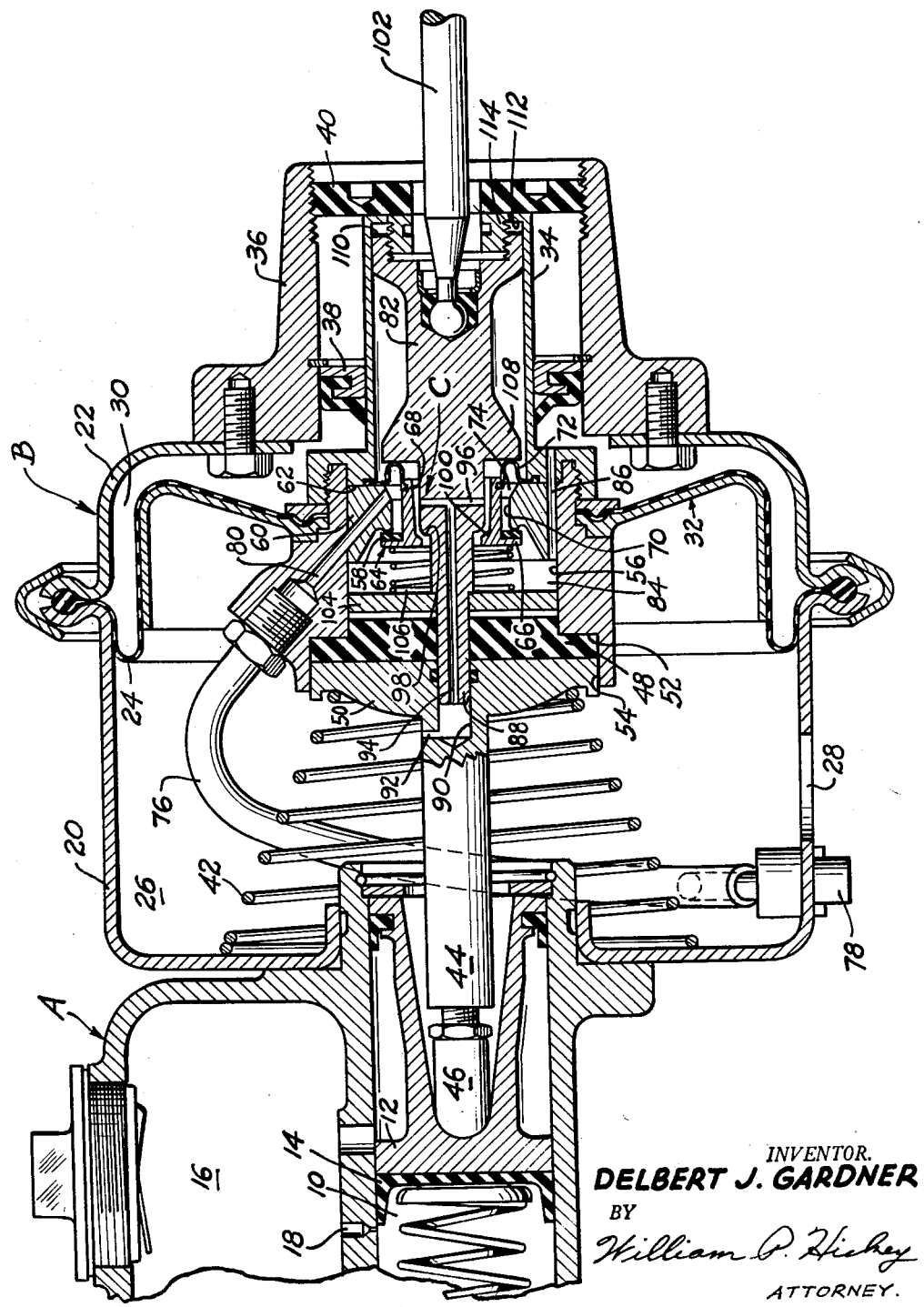
INVENTOR.
DELBERT J. GARDNER
BY
William P. Hickey
ATTORNEY.

United States Patent Office 3,082,744
Patented Mar. 26, 1963

3,082,744
SERVOMOTOR CONTROL VALVE
Delbert J. Gardner, South Bend, Ind., assignor to The Bendix Corporation, South Bend, Ind., a corporation of Delaware
Filed Aug. 2, 1961, Ser. No. 128,719
6 Claims. (Cl. 121—41)

The present invention relates to control valve structures generally; and more particularly to control valve structures for fluid pressure servomotors and the like.

In control valves, particularly of the poppet type, there exists a pressure differential across the valve closure member which either biases it away from or toward its cooperating valve seat. Where the force biases the valve closure member against the seat, a considerable amount of force must be used to open the valve; and where the differential pressure is such as to bias the valve closure member away from the seat, external force must be applied to the poppet member to hold the valve closure member against the seat. In control valve structures of the type with which we are concerned, it is desired that the valve closure member can be opened and closed with a minimum of valve actuating force; and accordingly there is provided a diaphragm which produces a force on the valve closure member which is generally equal and opposite to the pressure forces that are exerted across the valve closure member. Where a diaphragm is used to balance these forces however, the balancing of these forces cannot be complete otherwise there will be insufficient force upon the valve closure member when it abuts its seat to provide a suitable seal. Even where balancing diaphragms are used, therefore, there is a noticeable increase in force that is felt by the operator as he actuates the valve at the time that the valve closure member is lifted free of its seat.

One object of the present invention therefore is the provision of a new and improved control valve structure which has an adequate sealing force to prevent leakage in its closed position, but in which there is no sudden build-up in force or "bump" encountered during actuation of the valve at the time that the valve closure member lifts free of its seat.

A more particular provision of the present invention is the provision of a new and improved control valve structure of the above described type wherein a valve balancing diaphragm is used, and wherein the control member is of the valve abuts the valve balancing diaphragm and partially "washes out" the diaphragm just prior to the time that the valve closure member is lifted free of its seat.

It will be apparent that there must be an appreciable amount of valve actuating movement in structures of the immediately above referred to type wherein there is a partial "washing out" of the diaphragm prior to the time that the valve closure member lifts free of its valve seat. It is highly desirable in control valves generally and particularly in control valves for fluid pressure servomotors that the amount of control movement which is initially required to actuate the valve be as small as possible. In control valves for fluid pressure servomotors, valve actuating movement in one direction from its totally closed position causes the motor's movable wall to move in one direction, and valve actuating movement in the opposite direction from its totally closed position causes the movable wall to move in the opposite direction. A throttling action usually occurs as the control valve is moved in either direction from its totally closed position, and stop means are usually provided to limit the retraction of the movable wall.

Another object of the present invention is the provision of a new and improved control valve for a fluid pressure servomotor having an appreciable amount of throttling movement for controlling the speed with which the movable wall approaches its fully retracted position, and in which additional stop means are provided for partially closing the control valve structure when the movable wall is in its fully retracted position, so that a reactuation of the servomotor can be had thereafter with a minimum of valve actuating movement.

The invention resides in certain constructions and combinations and arrangements of parts; and further objects and advantages of the invention will become apparent to those skilled in the art to which it relates from the following description of the preferred embodiment described with reference to the accompanying drawing forming a part of this specification, and in which:

The solitary FIGURE is a longitudinal cross sectional view of a fluid pressure motor actuated hydraulic master cylinder which is used to actuate the hydraulic brakes of an automotive vehicle.

The fluid pressure servomotor driven master cylinder shown in the drawing generally comprises a master cylinder A having a fluid pressure chamber 10 therein from which pressure is supplied to the braking system, not shown, by means of a hydraulic piston 12 having the conventional cup seal 14 on its forward face. The master cylinder A also includes the usual fluid compensating reservoir 16 which is communicated to the chamber 10 just forwardly of the normal retracted position of the cup seal 14 by means of the small compensating port 18. Forward movement of the piston 12 therefore causes the seal to slide over the compensating port 18, and thereafter force fluid from the hydraulic chamber 10 to the vehicle's hydraulic brake system.

The hydraulic piston 12 is adapted to be poser actuated by means of a fluid's pressure servomotor B. The fluid pressure servomotor B may be of any suitable type and as shown in the drawing is compressed air actuated.

The housing of the servomotor is formed in two sections 20 and 22, between which is suitably sealingly clamped a power diaphragm 24. The movable wall or diaphragm 24 divides the internal chamber of the servomotor B into a front opposing power chamber 26 into which atmospheric pressure is continually communicated by the opening 28, and a rear opposing power chamber 30 into which compressed air is admitted when it is desired to power actuate the servomotor. The center portion of the diaphragm 24 is suitably stiffened by the diaphragm plate 32; and control of the servomotor B is had by means of the control valve structure C which is mounted in and carried by the center portion of the diaphragm plate 32. The diaphragm stiffening structure 32 further includes a rearwardly extending tubular projection 34 that extends into the tubular boss 36 fastened to the back side of the shell section 22; and a suitable seal 38 is provided between the tubular section 34 and the tubular boss 36. Rearward or retractile movement of the diaphragm stiffening structuer 32 is limited by the annular stop plate 40 that is adjustably threaded into the outer end of tubular boss 36, and against which the rear end of its tubular projection 34 is biased by means of the power diaphragm return spring 42. Force from the diaphragm stiffening structure 32 is transferred to the hydraulic piston 12 by means of a headed push rod 44 having an adjustable extension 46 thereon which bears against the piston 12; and a block of rubber 48 is interpositioned between the head 50 of the push rod 44 and the forwardly facing bottom wall 52 of a receiving opening 54 in the front face of the stiffening structure 32.

The control valve structure C shown in the drawing is generally positioned in an axially extending opening 56 which extends between the block of rubber 48 and the central opening through the rearwardly extending tubular projection 34. A forwardly facing high pressure valve seat 58 is formed on the front face of an annular valve seat member 60 which is pressed into the opening 56 against a shoulder 62 formed by the rearwardly extending tubular projection 34. The high pressure valve seat 58 is adapted to be closed off by an annular closure or poppet member 64 having a radially extending flange 66 which abuts the valve seat 58 and an annular tubular portion 68 which extends rearwardly through the central opening 70 of the annular valve seat member 60. The rear end of the tubular portions 68 is sealingly fastened to the inner end of a valve balancing diaphragm 72, and the radially outer periphery of the valve balancing diaghragm 72 is sealingly clamped between the valve seat member 60 and the rearwardly projecting portion 34. The annular space between the tubular portion 68 of the poppet and valve seat member 60 is closed off by the diaphragm 72 and flange 66 to form a high pressure valve chamber 74. Compressed air is continually comunicated to the valve chamber 74 by means of the flexible conduit 76 that extends between the external connection 78 and the passageway 80 that directly communicates with the chamber 74.

The fluid pressure servomotor B shown in the drawing is an atmospheric suspended unit in which atmospheric pressure is communicated to both of the opposing power chambers 26 and 30 when the movable wall 24 is in its retracted position shown in the drawing, and in which compressed air is communicated to the rear opposing power chamber 30 when it is desired to actuate the unit. As previously indicated, atmospheric pressure is continually communicated to the front opposing power chamber 26 and the control valve structure C is provided with an axially movable control member 82 for normally communicating this atmospheric pressure to the rear opposing power chamber 30 in the normal retracted position of the control member 82. The control member 82 is also arranged to close off this atmospheric communication and admit compressed air from the chamber 74 to the rear power chamber 30 when the control member 82 is actuated forwardly. The space 84 forwardly of the poppet member 66 forms the control chamber of the valve, and this space is continually communicated to the rear opposing power chamber 30 by means of the control passageway 86. The control member 82 is provided with a forwardly extending tubular projection 88 which is sealingly received in a suitable bore 90 in the push rod 44, and the bore 90 is continually communicated to the front chamber 26 by means of the transverse passage 92. Atmospheric pressure therefore is continually communicated to the central opening 94 of the tubular extension 88, from which it is communicated to the region rearwardly of the poppet member 66 by means of the transverse passage 96. Control of the flow of atmospheric pressure between the transverse passage 96 and the valve's control chamber 84 is had by means of a shoulder 98 on the control member 82 which is adapted to abut a radially inwardly extending atmospheric valve seat 100 formed on the poppet member 66. The internal opening through the tubular extension 68 of the poppet member 66 is generally tapered in the direction of the valve seat 100 so as to provide an increased throttling action of the atmospheric flow therethrough as the shoulder 98 approaches its atmospheric seat 100.

In the normal deenergized condition of the servomotor shown in the drawing, the poppet member 66 abuts the high pressure valve seat 58 and the shoulder 98 is out of engagement with the atmospheric valve seat 100 to permit atmospheric flow through the opening 28, passages 92, 90, 94 and 96 to the central opening of the poppet section 68. Shoulder 98 is normally out of engagement with the atmospheric valve seat 100 so that communication is established with the control chamber 84 and thence through control passage 86 to the rear opposing power chamber 30. The power piston return spring 42 acting through the head 50 of the piston rod 44 and block of rubber 48 exerts a force on the shoulder 52 of the diaphragm stiffening structure 32 which causes its rearwardly extending projection 34 to abut the adjustable stop 40. When it is desired to actuate the servomotor, the push rod 102 that is connected to the control member 82 is moved forwardly to cause the shoulder 98 to abut the atmospheric valve seat 100 and thereafter lift the poppet member 64 clear of the high pressure valve seat 58. This admits compressed air from the high pressure chamber 74 to the control chamber 84 and thence to the rear opposing power chamber 30 to drive the diaphragm structure 24 forwardly. Forward movement of the diaphragm's stiffening structure 32 acts through the rubber block 48 to produce force upon the head 50 of the push rod 44 which overcomes the coil spring 42 and forces the piston 12 into the hydraulic chamber 10 of the master cylinder A to actuate the vehicle's brakes.

There is also provided in the structure shown in the drawing a means for producing a force upon the control member 82 in a rearward direction which is generally proportional to the force that is exerted upon the push rod 44 in order to provide an indication to the operator of the amount of braking effort which is being obtained. This is accomplished in the structure shown in the drawing by means of a reaction disc 104 which is suitably fixed to the control member 82 for sliding movement in the opening 56 in a manner to abut the block of rubber 48. In the unpressurized condition of the block of rubber 48, there is normally provided sufficient clearance between the rubber and reaction disc 104 to allow for valve actuating movement. As the servomotor B is actuated and the block of rubber 48 compressed between the diaphragm stiffening structure 32 and push rod 44, the block of rubber 48 is deformed up against the reaction disc 104 to resist further valve actuating movement. When the amount of braking effort desired is achieved, forward movement of the control push rod 102 is stopped by the operator; whereupon compressed air flow through the valve structure C continues sufficiently to permit the high pressure valve seat 58 to move forwardly into engagement with the poppet member 64 and thereafter close off further flow of air to the rear opposing power chamber 30. When it is desired to reduce the braking effort, the force on the control rod 102 is reduced; whereupon the force exerted by the block of rubber 48 against the reaction disc 104 forces the shoulder 98 out of engagement with the atmospheric valve seat 100 to conduct high pressure air out of the rear opposing power chamber 30 through the atmospheric passages 96, 94, 90 and 92. Whenever it is desired to prevent further reduction in braking effort, rearward movement of the control rod 102 is stopped; whereupon the diaphragm stiffening structure 32 moves rearwardly a slight additional amount to bring the atmospheric valve seat 100 into engagement with the shoulder 98 to prevent further reduction in air pressure in the rear opposing power chamber 30. When it is desired to completely release the brakes, all force on the push rod 102 is removed; whereupon air pressure upon the shoulder 98 forces it clear of the atmospheric valve seat 100, and the stiffening structure 32 moves rearwardly until its tubular projection 34 abuts the adjustable stop member 40.

The valve balancing diaphragm 72 may in some instances be designed to over-balance the forces upon the poppet members 64 so as to assure it positive sealing force between the flange 66 and high pressure valve 58. The diaphragm shown in the drawing has been sized to provide a force approximately equal to the pressure forces tending to move the poppet member 64 off of the seat 58, and a valve seating 106 has been provided to provide a positive force which produces the necessary sealing engagement between the poppet member and valve seat. As the control member 82 is moved forwardly therefore from its initial starting position, very little force is required until the shoulder 98 engages the valve seat 100; and thereafter an abrupt increase in force is required to overcome the coil spring 106 and lift the poppet 64 out of engagement with the valve seat 58.

According to principles of the present invention, this abrupt build-up in resistance to actuating force on the control member 82 is prevented by providing suitable means, as for example the shoulder 108 on the control member 82, for abutting the diaphragm 72 prior to the time that the poppet member 64 is moved out of engagement with its seat 58 to thereby produce a more gradual application of force from the control member 82 to the poppet member 64. The diaphragm 72 is forced in the direction of the control member 82 by reason of the differential pressure across the diaphragm; and it has been found that there is a gradual increase in force produced upon the shoulder 108 after it first abuts the diaphragm 72 to thereafter deform or "wash out" the diaphragm 72. As the shoulder 108 abuts an increasing area of the diaphragm 72, an increasing amount of the balancing force which the diaphragm had previously exerted upon the poppet member 64 is now transmitted directly to the control member 82 so that a reduction in the balancing force between the poppet 64 and valve seat 58 occurs. This produces a gradual decrease of the forces on the poppet member 64 which overcome the pressure forces tending to unseat the poppet so that at the time that the shoulder 98 abuts the atmospheric valve seat 100, very litle increase in force is required to move the poppet member 64 out of engagement with the valve seat 58.

According to still further principles of the present invention, a considerable amount of throttling action takes place between the shoulder 98 and the poppet member 64 over an appreciable or extended forward movement of the control member 82 prior to the engagement of the shoulder 98 with the valve seat 100. This occurs in the valve construction shown in the drawing by reason of the tapered internal opening in the poppet member 64. In order to produce a fast release of the vehicle's brakes therefore, it is necessary that the shoulder 98 be moved rearwardly of the atmospheric valve seat 100 by an appreciable distance that is generally provided by the clearance 110 shown between the right hand end of the member 82 and the internal shoulder 112 adacent the end of the tubular projection 34. When the servomotor B has been actuated, therefore, and the diaphragm stiffening structure 34 has been moved out of engagement with the stop 40, a fast release can be obtained by relieving all pressure on the push rod 102; whereupon control member 82 moves rearwardly to abut the shoulder 112. Fast release of air pressure past the valve seat 100 is therefore accomplished to permit the diaphragm stiffening structure to quickly approach the stop member 40.

According to further principles of the invention stop means 114 is preferably provided for moving the control member 82 in an actuating direction as the tubular projection 34 approaches its stop 40 to partially close the control valve structure C. This has a cushioning effect on the return movement of the power diaphragm structure; and further takes up some of the valve travel that would otherwise be required during the next actuation of the unit. During the next application, the control member 82 will only have to be moved a short distance to cause the shoulder 98 to abut the atmospheric valve seat 100 and open the poppet 64 with respect to its valve seat 58. By this expedient, the amount of actuating movement for the push rod 102 initially required to activate the servomotor B is greatly reduced. This is highly desirable in automotive braking systems where the control rod 102 is actuated by means of a brake pedal lever having a considerable mechanical advantage; inasmuch as any lost motion of the foot pedal lever prior to the actuation of the servomotor is highly objectionable. The stop means 114 is made adjustable by providing a threaded connection between a ring 114 which abuts the stop 40 and the control member 82; and in the preferred embodiment shown in the drawing, this ring is preferably adjusted so as to move the shoulder 108 on the control member 82 forwardly to the point where it just begins to contact the diaphragm 72. This eliminates much of the valve actuating movement initially required to move the control member 82 out of engagement with the shoulder 112, and at the same time does not reduce the sealing forces between the poppet 64 and high pressure valve seat 58. In other instances depending upon the amount of balancing which is done by the diaphragm 72, it may be desirable to have the stop means 114 partially "wash out" the diaphragm in the normal retracted position.

It will be apparent that the objects heretofore enumerated as well as others have been accomplished; and that there has been provided a new and improved control valve structure having particular advantages in fluid pressure servomotors, and in which control valve "bump" and valve travel during initial actuation is greatly reduced.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim:

1. In a fluid pressure servomotor and the like: a housing; a pressure responsive movable wall in said housing movable in first and opposite directions; valve means in said movable wall for controlling differential pressure across said movable wall, said valve means including a control member having a center position wherein it prevents fluid flow to either side of said movable wall, a wide open actuating position spaced in said first direction from said center position wherein it causes a pressure differential across said movable wall which biases said movable wall in said first direction, and a wide open retracted position spaced in said opposite direction from said center position wherein it decreases said pressure differential across said movable wall to cause said movable wall to move in said opposite direction; first stop means limiting movement of said movable wall in said opposite direction; and second stop means which moves said control member from its wide open retracted position toward said center position when said first stop means has limited movement of said movable wall, said second stop means being adjustable.

2. In a fluid pressure servomotor and the like: a housing having an axially extending internal chamber; a pressure responsive movable wall movable in said chamber in first and opposite axial directions; a control valve in said movable wall including a valve port for communicating a source of pressure for the power actuation of said movable wall, a valve seat around said valve port, a valve closure member for said valve seat; a control member for said valve closure member, said control member causing said valve closure member to be moved to an open position with respect to said valve seat when said control member is moved a predetermined distance in a first direction from a normal retracted position, a balancing diaphragm for said valve closure member, said diaphragm having a U-shaped portion which is pressure biased toward said retracted position of said control member, and said control member abutting increasing areas of said U-shaped portion of said balancing diaphragm as said control member is moved from its retracted position to a position wherein said valve closure member is open with respect to said valve seat.

3. In a fluid pressure servomotor and the like: a housing having an axially extending internal chamber; a pressure responsive movable wall movable in said chamber in first and opposite axial directions; valve means in said movable wall for controlling differential pressure across said movable wall, said valve means including a control member having a center position wherein it prevents fluid flow to either side of said movable wall, a wide open actuating position spaced in said first direction from said center position wherein it causes a pressure differential across said movable wall which biases said movable wall in said first direction, and a wide open retracted position spaced in said opposite direction from said center position wherein it decreases said pressure differential across said movable wall to cause said movable wall to move in said opposite direction, said control member increasing throttling flow through said valve means as it is moved from said wide open retracted position toward said center position, a valve balancing diaphragm operatively connected to said valve means, said diaphragm having a U-shaped portion pressure biased in said opposite direction for initial contact by said control member at an intermediate position of said control member spaced between said retracted and center positions; first stop means limiting movement of said movable wall in said opposite direction; and second stop means which moves said control member from its retracted position to said intermediate position when said first stop means has limited movement of said movable wall in said opposite direction.

4. In a fluid pressure servomotor and the like: a housing having an axially extending internal chamber; a pressure responsive movable wall movable in said chamber in first and opposite axial directions and having a retracted position from which it is movable in said first direction when power actuated; a first valve seat carried by said movable wall and facing in said first direction; a poppet member for abutting said valve seat; a poppet balancing diaphragm extending between said poppet member and movable wall, said diaphragm having a U-shaped portion pressure biased in said opposite direction, a second valve seat carried by said poppet member, a control member positioned in said opposite direction from said poppet member and arranged to close off said second valve seat when moved in said first direction, said control member being movable from a retracted position wherein said second valve seat is fully open and said first valve seat fully closed to an actuating position spaced in said first direction wherein said second valve seat is fully closed and said first valve seat is open, and said control member having an intermediate position wherein said second valve seat is partially closed and said control member begins to operatively abut said balancing diaphragm to place a reactive load on said control member.

5. In a control valve: a body member; a valve seat in said body member; a valve closure member for said valve seat; a control member for said valve closure member, said control member causing said valve closure member to be moved to an open position with respect to said valve seat when said control member is moved a predetermined distance in a first direction from a normal retracted position, a balancing diaphragm for said valve closure member, said diaphragm being pressure biased toward said retracted position of said control member, and said control member abutting increasing areas of said balancing diaphragm as said control member is moved from its retracted position to a position wherein said valve closure member is open with respect to said valve seat.

6. In a control valve: a body member; valve means in said body member for controlling flow through said valve, said means including a control member having a center position wherein it prevents fluid flow to either side of said movable wall, a wide open actuating position spaced in said first direction from said center position wherein it causes a pressure differential across said movable wall which biases said movable wall in said first direction, and a wide open retracted position spaced in said opposite direction from said center position wherein it decreases said pressure differential across said movable wall to cause said movable wall to move in said opposite direction, said control member increasingly throttling said flow through said valve means as it is moved from said wide open retracted position toward said center position, a valve balancing U-shaped diaphragm operatively connected to said valve means, said U-shaped portion of said diaphragm being pressure biased in said opposite direction for initial contract by said control member at an intermediate position of said control member as it moves from said retracted position to said center position.

References Cited in the file of this patent
UNITED STATES PATENTS

| | | |
|---|---|---|
| 2,745,383 | Hupp | May 15, 1956 |
| 2,953,120 | Ayers | Sept. 20, 1960 |
| 2,976,846 | Stelzer | Mar. 28, 1961 |